Dec. 14, 1954     G. V. CONSTANTAKIS     2,696,657
TIRE TREAD LACERATING TOOL
Filed Feb. 9, 1952     2 Sheets-Sheet 1
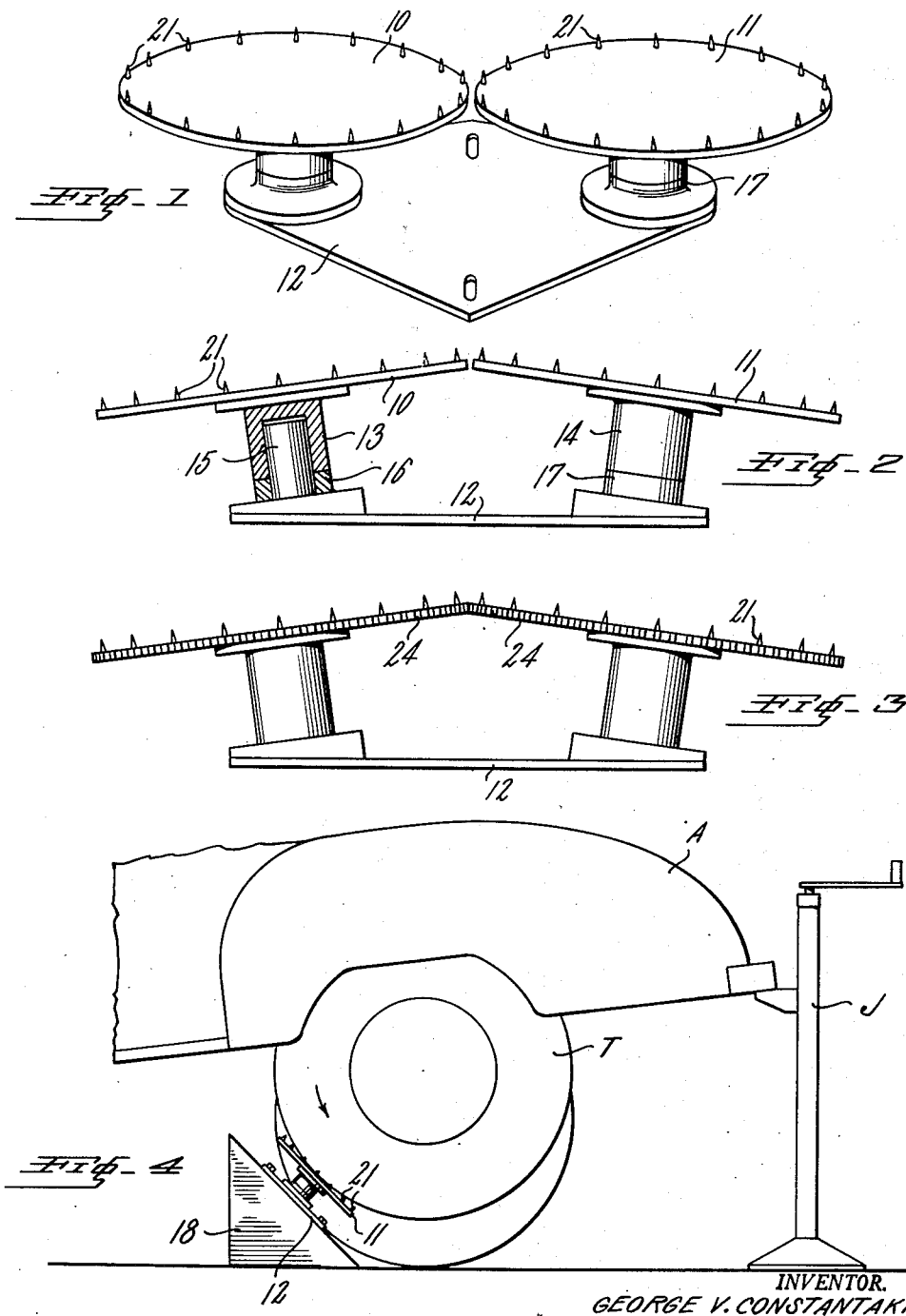
INVENTOR.
GEORGE V. CONSTANTAKIS
BY
ATTORNEY Dec. 14, 1954   G. V. CONSTANTAKIS   2,696,657
TIRE TREAD LACERATING TOOL
Filed Feb. 9, 1952   2 Sheets-Sheet 2

INVENTOR.
GEORGE V. CONSTANTAKIS
BY
ATTORNEY

United States Patent Office 2,696,657
Patented Dec. 14, 1954

2,696,657

TIRE TREAD LACERATING TOOL

George V. Constantakis, Allen Park, Mich., assignor to United States Rubber Company, New York, N. Y., a corporation of New Jersey Application February 9, 1952, Serial No. 270,883

6 Claims. (Cl. 29—76)

This invention relates to a tool for lacerating the tread of a tire to increase the traction thereof.

It is one object of the invention to provide a tool which can be used to lacerate the tread of a tire in a variety of patterns.

It is another object to provide a tool which is of simple inexpensive construction and which may be used by a comparatively unskilled operator to lacerate the tread of a tire while the tire is mounted on an automobile.

Figure 5:
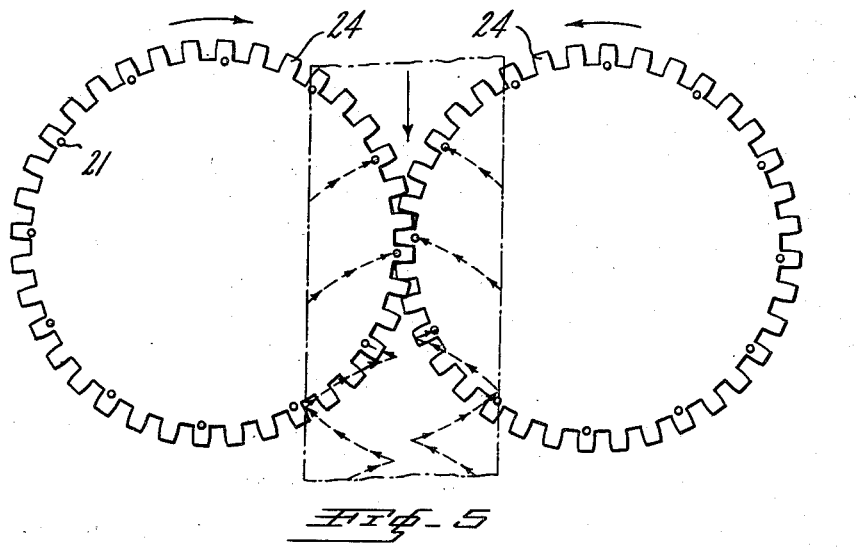
Figures 6, 7, 8:
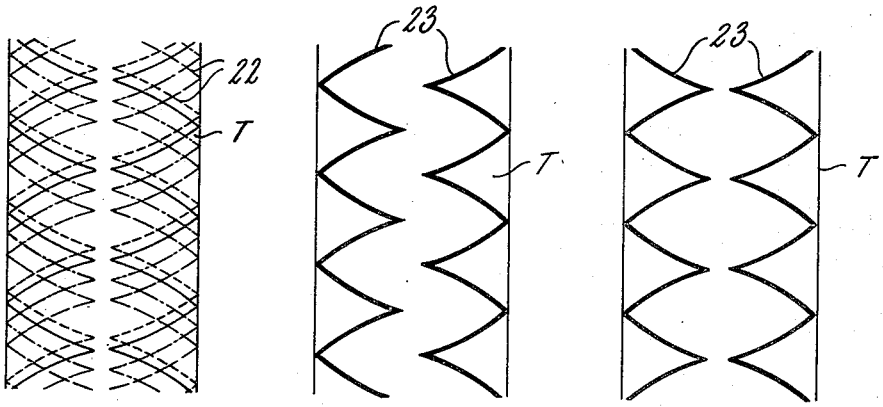

Other objects and advantages of the present invention will become apparent from the following description when read in conjunction with the accompanying drawing wherein:

Fig. 1 is an isometric view of one embodiment of the present invention,

Fig. 2 is a partial sectional view of a modification of the embodiment shown in Fig. 1, Fig. 3 is an elevational view of still another modification of the embodiment shown in Fig. 1, Fig. 4 is an elevational view showing the manner in which the present invention may be used to lacerate the tread of a tire while it is mounted on an automobile, Fig. 5 is a plan view of the modification of Fig. 3 showing the path of movement of the lacerating elements of the tool of the invention relative to the tire tread, Fig. 6 is a development of the tread of a tire showing the random pattern which may be formed therein by the apparatus of the invention on initial or continued operation, Fig. 7 is a development of the tread of a tire showing one groove pattern which may be formed therein by the apparatus of the invention on continued operation, and Fig. 8 is a development of the tread of a tire showing another groove pattern which may be formed therein by the apparatus of the invention on continued operation.

Referring to the drawing and in particular to Fig. 1 of the drawing, the apparatus of the invention includes two circular plates 10 and 11. The plates 10 and 11 are mounted for free rotation on a base 12 in side by side relationship so that each is contained in substantially the same plane and the peripheries thereof are substantially tangent.

As best shown in Fig. 2, each of the plates 10 and 11 have hollow hubs 13 and 14 respectively, secured to the bottom faces thereof and concentric therewith. The hollow hubs 13 and 14 fit over cylindrical posts or shafts 15 secured to the base 12. The posts 15 are provided with suitable thrust bearings 16 and 17 interposed between the hub and the base to take the axial thrust.

Each of the plates are provided with a plurality of equally spaced lacerating elements 21 in the form of pointed pins secured to the plates adjacent their peripheries.

In utilizing the apparatus to lacerate the tread of a tire, the apparatus is placed adjacent the tread of a tire with the center line of the tire in alignment with the point of tangency between the plates. To assist in maintaining this alignment, it is desirable to have the plate set so as to provide a dihedral angle of slightly less than 180° as shown in Figs. 2 and 3. In Figs 2 and 3 the dihedral angle is considerably exaggerated for the purpose of illustration. This gives a high point at the point of tangency which gives a "crown" effect similar to that in a crowned pulley so that the tire tends to ride to the high point and therefore maintain proper alignment with the tool.

The tool may be placed directly under the tire and anchored against movement by being bolted to the floor or it may be anchored to the automobile in accordance with my invention as described in my copending application, Serial No. 270,882, filed February 9, 1952, now Patent No. 2,675,075 issued April 13, 1954. The tool may also be secured to a wedge shaped member 18 as shown in Fig. 4 so that the vertical component of force created by the rotating tire will serve to anchor the apparatus.

The lacerating operation may be performed while the tire T is mounted on an automobile A as shown in Fig. 4 by jacking up the tire to be lacerated. Feeding of the tire tread against the tool many be accomplished by gradually lowering the wheel against the tool by the jack J. The tire tread may be also fed against the tool by rotating the tire at sufficient speed to expand it radially against the tool in accordance with the method described in my copending application, Serial No. 270,881, filed February 9, 1952, now Patent No. 2,675,073 issued April 13, 1954.

As the rotating tire engages the pointed pins 21 of the plates 10 or 11, the plates are rotated thereby and the pins 21 tear paths 22 in the tread as the plates are rotated and give a random pattern as shown in Fig. 6. A random pattern results because the pins 21 do not engage the tire at the same point on each revolution of the tire because of slippage between the tire and the tool on initial operation. On continued rotation of the tire, less slippage occurs and the cutters tend to repeat the pattern and produce grooves as shown at 23 in Figs. 7 and 8. It is to be understood that the groove patterns of Figs. 7 and 8 are superimposed on the random pattern of Fig. 6 and that a random groove pattern may result if slippage continues though the tendency is toward a repeated pattern as shown in Figs. 7 and 8. As shown in Fig. 5, the pins on one plate form one-half of the pattern and the pins on the other plate form the other half of the pattern. The relative positions of the pins on one plate with respect to the position of the pins on the other plate determines the phase relationship of the two halves of the pattern.

In using the apparatus of Figs. 1 and 2 the phase relationship of the pattern halves cannot be predetermined as the relative positions of the pins on one plate with respect to the pins on the other plate may change due to unequal slippage or rotation of the plates.

The phase relationship between the pattern halves can, however, be predetermined by using the apparatus shown in Figs. 3 and 5. This apparatus is similar to that of Figs. 1 and 2, but has been modified by providing meshing gear teeth 24 on the peripheries of the plates 10 and 11. This gear arrangement positively fixes the position of the pins on one plate relative to the pins on the other plate and prevents one plate from rotating at a greater speed than the other. This will give a predetermined pattern to the grooves cut in the tread. For example, if the pins on one plate are positioned relative to the pins on the other plate as shown in Fig. 5, the resulting pattern will be as shown by the dashed lines in Fig. 5.

If the pins on one plate are positioned so that when they are at the point of tangency exactly split the distance between two adjacent pins on the other plate, then the resulting pattern will be out of phase as shown in Fig. 7. On the other hand, if the pins on one plate are positioned so that the pins on the other plate are at the point of tangency between the plates at the same time that the pins on the other plate are at the point of tangency then the pattern halves will be exactly in phase as shown in Fig. 8. While the pins 21 have been shown and described as equally spaced, it is to be understood that other variations of the pattern produced can be made by varying the spacing between the pins 21.

From the above description it can be seen that there is provided a simple apparatus for lacerating the tread of a tire to increase the traction thereof which may be utilized by a comparatively unskilled operator while the tire is mounted on an automobile.

Having thus described my invention, what I claim and desire to protect by Letters Patent is:

1. Apparatus for lacerating the tread of a tire comprising, a base, a pair of circular plates mounted for free rotation about their centers on said base, the peripheries of said plates being substantially tangent to each other, and a plurality of spaced lacerating elements secured to and extending up from one face of each of said plates adjacent their peripheries.

2. Apparatus for lacerating the tread of a tire comprising, a base, a pair of circular plates mounted for free rotation about their centers on said base, the peripheries of said plates being substantially tangent to each other, a plurality of spaced pointed pins secured to and extending up from one face of each of said plates adjacent their peripheries, and means coupling said plates together so that both must rotate at the same angular velocity.

3. Apparatus for lacerating the tread of a tire comprising, a base, a pair of flat circular plates mounted for free rotation about their centers on said base, the peripheries of said plates being substantially tangent and contained in substantially the same plane, and a plurality of spaced pointed pins secured to and extending up from one face of each of said plates adjacent their peripheries.

4. Apparatus for lacerating the tread of a tire comprising, a base, a pair of circular plates mounted for free rotation about their centers on said base, the peripheries of said plates being substantially tangent, the dihedral angle between the planes of said plates being slightly less than 180° to thereby provide a high point at the point of substantial tangency between the peripheries of said plates, and a plurality of pointed pins secured to and extending up from one face of each of said plates adjacent their peripheries.

5. Apparatus for lacerating the tread of a tire comprising, a base, a pair of circular plates of equal diameter mounted and spaced in side by side relationship for free rotation about their centers on said base, the peripheries of said plates being substantially tangent to each other, and a plurality of equally spaced pointed pins secured to and extending up from one face of each of said plates adjacent their peripheries.

6. Apparatus for lacerating the tread of a tire comprising, a wedge shaped base, a pair of circular plates mounted for free rotation about their centers on one side of said base, the peripheries of said plates being substantially tangent to each other, a plurality of spaced pointed pins secured to and extending up from one face of each of said plates adjacent their peripheries.

References Cited in the file of this patent

UNITED STATES PATENTS

| Number | Name | Date |
|---|---|---|
| 2,294,047 | Pollock | Aug. 25, 1942 |
| 2,516,294 | Berthiez | July 25, 1950 |
| 2,581,928 | Broden | Jan. 8, 1952 |

FOREIGN PATENTS

| Number | Country | Date |
|---|---|---|
| 692,720 | France | Nov. 10, 1930 |
| 705,546 | Germany | May 2, 1941 |